(12) United States Patent  
Boshra

(10) Patent No.: US 7,599,530 B2
(45) Date of Patent: Oct. 6, 2009

(54) METHODS FOR MATCHING RIDGE ORIENTATION CHARACTERISTIC MAPS AND ASSOCIATED FINGER BIOMETRIC SENSOR

(75) Inventor: Michael Boshra, Indialantic, FL (US)

(73) Assignee: AuthenTec, Inc., Melbourne, FL (US)

( * ) Notice: Subject to any disclaimer, the term of this patent is extended or adjusted under 35 U.S.C. 154(b) by 511 days.

(21) Appl. No.: 10/957,335

(22) Filed: Oct. 1, 2004

(65) Prior Publication Data

US 2005/0117785 A1 Jun. 2, 2005

Related U.S. Application Data

(60) Provisional application No. 60/507,794, filed on Oct. 1, 2003.

(51) Int. Cl.
G06K 9/00 (2006.01)

(52) U.S. Cl. ..................... 382/124
(58) Field of Classification Search ......... None
See application file for complete search history.

(56) References Cited

U.S. PATENT DOCUMENTS

| | | | |
|---|---|---|---|
| 5,067,162 A | 11/1991 | Driscoll, Jr. et al. | 382/5 |
| 5,325,442 A | 6/1994 | Knapp | 382/4 |
| 5,335,289 A * | 8/1994 | Abdelazim | 382/177 |
| 5,351,303 A | 9/1994 | Willmore | 382/2 |
| 5,689,576 A | 11/1997 | Schneider et al. | 382/124 |
| 5,737,439 A | 4/1998 | Lapsley et al. | 382/115 |
| 5,909,501 A * | 6/1999 | Thebaud | 382/124 |
| 5,940,526 A | 8/1999 | Setlak et al. | 382/124 |
| 5,953,441 A | 9/1999 | Setlak | 382/124 |
| 6,118,890 A | 9/2000 | Senior | 382/125 |
| 6,134,340 A | 10/2000 | Hsu et al. | 382/124 |
| 6,241,288 B1 | 6/2001 | Bergenek et al. | 283/67 |
| 6,289,114 B1 | 9/2001 | Mainguet | 382/124 |
| 6,307,888 B1 * | 10/2001 | Le Clerc | 375/240.29 |
| 6,327,376 B1 | 12/2001 | Harkin | 382/124 |
| 6,483,929 B1 | 11/2002 | Murakami et al. | 382/115 |
| 6,546,122 B1 | 4/2003 | Russo | 382/125 |
| 6,560,352 B2 | 5/2003 | Rowe et al. | 382/115 |
| 7,006,673 B2 * | 2/2006 | Hamid | 382/124 |
| 7,197,168 B2 * | 3/2007 | Russo | 382/125 |

(Continued)

OTHER PUBLICATIONS

Bazen et al., *A Correlation-Based Fingerprint Verification System*, Proceedings of Workshop on Circuits Systems and Signal Processing, pp. 205-213, 2000.

(Continued)

*Primary Examiner*—Matthew C Bella
*Assistant Examiner*—Alex Liew
(74) *Attorney, Agent, or Firm*—Allen, Dyer, Doppelt, Milbrath & Gilchrist, P.A.

(57) ABSTRACT

A method for comparing a finger biometric verify ridge orientation characteristic map to a finger biometric enrollment ridge orientation characteristic map may include generating a first probability distribution function substantially for corresponding values of the verify and enrollment ridge orientation characteristic maps that differ from one another by less than or equal to a threshold difference. A second probability distribution function may be generated substantially for corresponding values of the verify and enrollment ridge orientation characteristic maps that differ from one another by more than the threshold difference. The verify ridge orientation characteristic map may be compared to the enrollment ridge orientation characteristic map to determine a match therewith based upon the first and second probability distribution functions.

29 Claims, 10 Drawing Sheets

U.S. PATENT DOCUMENTS

| | | | |
|---|---|---|---|
| 7,369,700 B2* | 5/2008 | Neumann et al. | 382/181 |
| 2001/0036300 A1* | 11/2001 | Xia et al. | 382/125 |
| 2002/0067845 A1 | 6/2002 | Griffis | 382/107 |
| 2002/0138768 A1 | 9/2002 | Murakami et al. | 713/202 |
| 2002/0181785 A1* | 12/2002 | Gutta et al. | 382/225 |
| 2003/0026495 A1* | 2/2003 | Gondek et al. | 382/261 |
| 2003/0123714 A1 | 7/2003 | O'Gorman et al. | 382/124 |
| 2003/0126448 A1 | 7/2003 | Russo | 713/186 |
| 2003/0169910 A1 | 9/2003 | Reisman et al. | 382/124 |
| 2003/0215155 A1* | 11/2003 | Serrano et al. | 382/254 |

OTHER PUBLICATIONS

Kovacs-Vanja, *A Fingerprint Verification System Based on Triangular Matching and Dynamic Time Warping*, IEEE Transactions on Pattern Analysis and Machine Intelligence, vol. 22, No. 11, Nov. 2000, pp. 1266-1276.

Coetzee et al., *Fingerprint Recognition in Low Quality Images*, Pattern Recognition, vol. 26, No. 10, pp. 1441-1460, 1993.

Halici et al., *Fingerprint Classification through Self-Organizing Feature Maps Modified to Treat Uncertainties*, Proceedings of the IEEE, vol. 84, No. 10, pp. 1497-1512, Oct. 1996.

Cappelli et al., *Fingerprint Classification by Directional Image Partitioning*, IEEE Transactions on Pattern Analysis and Machine Intelligence, vol. 21, No. 5, pp. 402-421, May 1999.

Almansa et al., *Fingerprint Enhancement by Shape Adaptation of Scale-Shape Operators with Automatic Scale Selection*, IEEE Transactions on Image Processing, vol. 9, No. 12, pp. 2027-2042, Dec. 2000.

Hong et al., *Fingerprint Image Enhancement: Algorithm and Performance Evaluation*, IEEE Transactions on Pattern Analysis, vol. 20, No. 8, pp. 777-789, Aug. 1998.

O'Gorman et al., *An Approach to Fingerprint Filter Design*, Pattern Recognition, vol. 22, No. 1, pp. 29-38, 1989.

Ratha et al., *Image Mosiacing for Rolled Fingerprint Construction*, 14th International Conference on Pattern Recognition-vol. 2, Aug. 16-20, 1998, Brisbane, Australia.

Yau et al., *On Fingerprint Template Synthesis*, Proceedings of Sixth International Conference on Control, Automation, Robotics and Vision (ICARCV 2000), Singapore. Dec. 5-8, 2000.

Brown, *A Survey of Image Registration Techniques*, Department of Computer Science, Columbia University, ACM Computing Surveys, vol. 24, No. 4, Dec. 1992.

Jain et al., *Fingerprint Mosaicking*, Proc. International Conference on Acoustic Speech and Signal Processing (ICASSP), Orlando, Florida, May 13-17, 2002.

Maltoni et al., *Handbook of Fingerprint Recognition*, Section 2.5, Touch Versus Sweep, pp. 65-69, Springer-Verlag, New York, 2003.

* cited by examiner

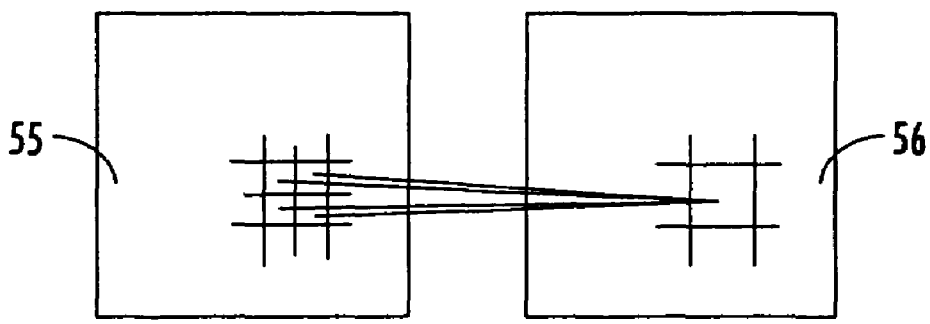
FIG. 5
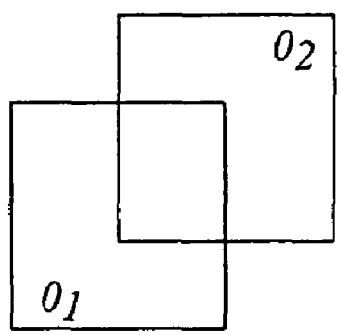
FIG. 6A  FIG. 6B  FIG. 6C
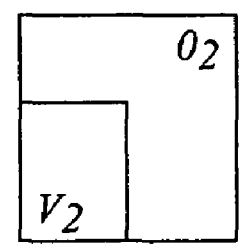
FIG. 7

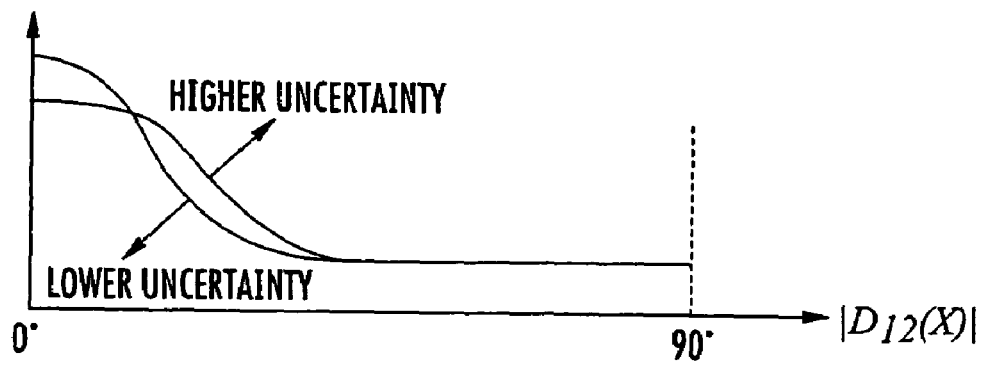
FIG. 8
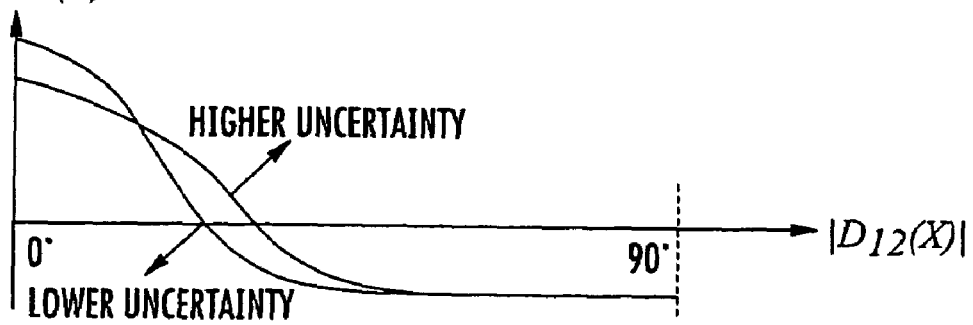
FIG. 9
FIG. 10

METHODS FOR MATCHING RIDGE ORIENTATION CHARACTERISTIC MAPS AND ASSOCIATED FINGER BIOMETRIC SENSOR

CROSS-REFERENCE TO RELATED APPLICATIONS

This application claims the benefit of U.S. Provisional Application No. 60/507,794, filed Oct. 1, 2003, which is hereby incorporated herein in its entirety by reference.

FIELD OF THE INVENTION

The present invention relates to the field of personal identification, and, more particularly, to finger biometric sensing and processing and related methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference or enrolled fingerprints already in a database to determine proper identification of a person, such as for verification purposes.

A significant advance in the area of fingerprint sensing is disclosed in U.S. Pat. No. 5,940,526 to Setlak et al., which is assigned to the assignee of the present invention. The patent discloses an integrated circuit fingerprint sensor including an array of RF sensing electrodes to provide an accurate image of the fingerprint friction ridges and valleys. More particularly, the RF sensing permits imaging of live tissue just below the surface of the skin to reduce spoofing, for example. The entire contents of the Setlak et al. patent are incorporated herein by reference.

Traditional approaches for fingerprint matching generally rely on minutia, which are point features corresponding to ridge ends and bifurcations. However, minutia-based matchers have two significant drawbacks. First, minutia extraction is difficult in images of poor quality. Second, a minimum fingerprint area is needed to extract a reasonable number of minutiae. Thus, minutia-based matchers are unsuitable in applications where poor-quality images or small sensors are involved. Using fingerprint pattern features, instead of minutiae, for matching can mitigate both of these drawbacks. Examples of fingerprint pattern features are image pixel values, ridge orientation, and ridge frequency.

Ridge orientation information has been used in a variety of stages in fingerprint recognition. It is commonly extracted through tessellating the fingerprint image into small square blocks or cells and estimating the dominant ridge orientation within each block. The resulting map is referred to as the ridge orientation map, or simply O-map. The O-map is also commonly referred to as the direction map in the fingerprint recognition literature.

Ridge orientation in fingerprint recognition has been used in a variety of different ways, one of which is orientation-adaptive fingerprint enhancement. This is perhaps the most common use of ridge orientation information. In this type of enhancement, each block is enhanced using a filter tuned to the estimated local ridge orientation (and possible ridge frequency as well). Fingerprint enhancement is a common early step for minutia extraction. Further details on orientation-adaptive fingerprint enhancement may be found in the following references: O'Gorman et al., "An Approach to Fingerprint Filter Design," Pattern Recognition, vol. 22, no. 1, pp. 29-38, 1989; Hong et al., "Fingerprint Image Enhancement: Algorithm and Performance Evaluation," IEEE Transactions on Pattern Analysis and Machine Intelligence, vol. 20, no. 8, pp. 777-789, August 1998; and Almansa et al., "Fingerprint enhancement by shape adaptation of scale-space operators with automatic scale selection," IEEE Transactions on Pattern Analysis and Machine Intelligence, vol. 9, no. 12, pp. 2027-2042, December 2000.

Another common use of ridge orientation is the classification of fingerprints into Henry's classes (right loop, left loop, whorl, arch, tented arch). Such classification may be performed using approaches such as a hidden Markov model, as discussed in U.S. Pat. No. 6,118,890 to Senior. Another classification approach includes inexact graph matching, as discussed in Cappelli et al., "Fingerprint Classification by Directional Image Partitioning," IEEE Transactions on Pattern Analysis and Machine Intelligence, vol. 21, no. 5, pp. 402-421, May 1999. Still another classification approach involves the use of neural networks, as discussed in Halici et al., "Fingerprint Classification Through Self-Organizing Feature Maps Modified to Treat Uncertainties," Proc. IEEE, vol. 84, no. 10, pp. 1497-1512.

Ridge orientation information has also been used for indexing, one example of which may be found in Coetzee et al., "Fingerprint recognition in low-quality Images," Pattern Recognition, vol. 26, no. 10, pp. 1441-1460, 1993. This article discusses the use of several classification techniques for indexing. A number of training images were acquired for each fingerprint in a selected set. Orientation maps were computed for each image and used for classifier training. Three types of classifiers were used: linear, nearest neighbor, and neural net.

Certain prior art techniques have also utilized ridge pattern information to some extent in fingerprint matching. One example is disclosed in U.S. Patent Pub. No. 2003/0169910 to Reisman et al. The matcher disclosed therein relies upon minutiae along with ridge pattern information encoded in responses to a bank of Gabor filters. An example of another matching system is disclosed in U.S. Pat. No. 5,909,501 to Thebaud. This system uses a combination of ridge orientation, ridge frequency and ridge offset. Each of the above-noted matchers organize the ridge pattern information in tessellated maps.

Despite the advantages of such systems, it may be desirable in some applications to more fully exploit ridge orientation characteristics in fingerprint processing operations, particularly matching, for example, to reduce dependency on minutia-based matching.

SUMMARY OF THE INVENTION

In view of the foregoing background, it is therefore an object of the present invention to provide a finger biometric sensor and related methods for processing finger biometric data based upon ridge orientation information.

This and other objects, features, and advantages in accordance with the present invention are provided by a method for processing finger biometric data which may include generating an initial ridge orientation characteristic map for the finger based upon the finger biometric data. Further, an amount of noise in the initial ridge orientation characteristic map may be estimated, and the initial ridge orientation characteristic map may be adaptively filtered based upon the amount of estimated noise therein to generate a final ridge orientation characteristic map.

More particularly, the amount of noise may be determined by filtering the initial ridge orientation characteristic map using a fixed filtering level to generate an intermediate ridge orientation characteristic map. The intermediate ridge orientation characteristic map may then be compared with the initial ridge orientation characteristic map to determine a variance therebetween, and the amount of noise may be based upon the variance.

Generating the initial ridge orientation characteristic map may include tessellating the finger biometric data into an array of cells, estimating at least one respective gradient for each cell, and generating the initial ridge orientation characteristic map based upon the estimated gradients. Moreover, estimating the at least one respective gradient for each cell may include estimating at least one initial gradient for each cell, and summing initial cell gradients from adjacent groups of cells in the array to generate at least one final gradient corresponding to each group.

As such, generating the initial ridge orientation characteristic map may include generating the initial ridge orientation characteristic map based upon the final gradients. The initial cell gradients from each group of cells may also be weighted prior to summing. Moreover, the at least one gradient may include a horizontal gradient, a vertical gradient, and a product of the horizontal and vertical gradients. The finger biometric data and/or the gradients may also be filtered prior to generating the initial enrollment ridge orientation characteristic map.

The finger biometric data may be finger biometric enrollment data, and the final ridge orientation characteristic map may therefore be an enrollment ridge orientation characteristic map. The method may also include generating a verify ridge orientation characteristic map based upon finger biometric verify data, and comparing the verify ridge orientation characteristic map to the enrollment ridge orientation characteristic map to determine a match therewith.

More particularly, the method may further include generating a first probability distribution function substantially for corresponding values of the verify and enrollment ridge orientation characteristic maps that differ from one another by less than or equal to a threshold difference. A second probability distribution function may be generated substantially for corresponding values of the verify and enrollment ridge orientation characteristic maps that differ from one another by more than the threshold difference. As such, the verify ridge orientation characteristic map may be compared to the enrollment ridge orientation characteristic map based upon the first and second probability distribution functions.

Additionally, the comparison may be based upon a combined probability distribution function comprising a weighted summation of the first and second probability distribution functions. Moreover, one of the first and second probability distribution functions may be weighted by a probability k that at least one set of corresponding values of the verify and enrollment ridge orientation characteristic maps will differ from one another by more than the threshold difference, and the other of the first and second probability distribution functions may be weighted by 1-k.

The method may further include generating a differential probability distribution function based upon differential properties of adjacent values in at least one of the verify and enrollment ridge orientation characteristic maps. Thus, the verify ridge orientation characteristic map may be compared to the enrollment ridge orientation characteristic map also based upon the differential probability distribution function. For example, a likelihood ratio may be generated based upon the first and second probability distribution functions and the differential probability distribution function.

Furthermore, an initial first probability distribution function and an initial second probability distribution function may be generated for a subset of corresponding values of the verify and enrollment ridge orientation characteristic maps. Also, a relative alignment may be determined between the verify and enrollment ridge orientation characteristic maps prior to comparing based upon the initial first and second probability distribution functions. The method may further include dividing at least one of the verify and enrollment ridge orientation characteristic maps into a plurality of sections, estimating a local deformation associated with each section based upon the determined relative alignment, and updating the relative alignment between the verify and enrollment ridge orientation characteristic maps based upon the estimated local deformations. A match failure may be generated if the determined relative alignment is smaller than an alignment threshold.

The method may further include determining an overlap between the verify ridge orientation characteristic map and the enrollment ridge orientation characteristic map. Thus, comparing may include comparing the verify ridge orientation characteristic map and the enrollment ridge orientation characteristic map based upon the overlap. Additionally, the verify ridge orientation characteristic map may be compared to a plurality of different angular rotations of the enrollment ridge orientation characteristic map. Advantageously, the verify ridge orientation characteristic map may be compared to the enrollment ridge orientation characteristic map based solely upon ridge orientation characteristics.

A finger biometric sensor in accordance with the present invention may include a finger biometric sensing area for sensing finger biometric enrollment data from a finger, and a processor connected to the finger biometric sensing area. The processor may be for arranging the finger biometric data into an array of cells, estimating at least one respective gradient for each cell, generating an initial ridge orientation characteristic map for the finger based upon the finger biometric data based upon the gradients, and estimating an amount of noise in the initial ridge orientation characteristic map. The processor may further adaptively filter the gradients based upon the amount of estimated noise, and generate a final ridge orientation characteristic map based upon the filtered gradients.

BRIEF DESCRIPTION OF THE DRAWINGS

FIG. 5 is a schematic block diagram illustrating the construction of gradient maps in accordance with the present invention.

FIGS. 6A-6C are schematic block diagrams illustrating ridge orientation characteristic map comparisons in accordance with the present invention.

FIG. 7 is a series of numerical tables illustrating a numerical ridge orientation characteristic comparison operation in accordance with the present invention.

FIG. 8 is a, graph illustrating uncertainty probabilities for different ridge orientation characteristic maps in accordance with the present invention.

FIG. 9 is a series of numerical tables illustrating one approach for estimating uncertainty. probability in accordance with the present invention.

FIG. 10 is graph illustrating a log likelihood ratio function for two different orientation uncertainties in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in different embodiments.

Figure 1:
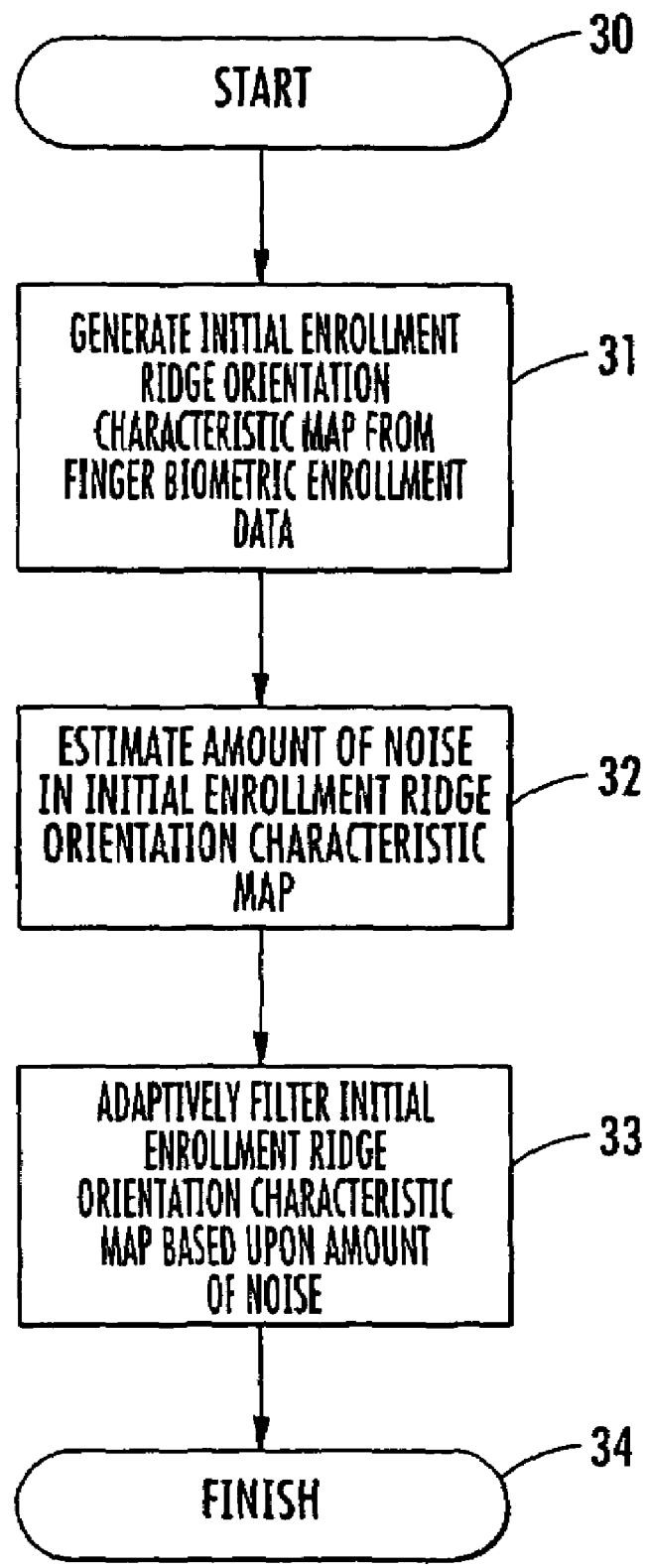
FIG. 1 is a flow diagram of a method for processing finger biometric enrollment data in accordance with the present invention.
Figure 2:
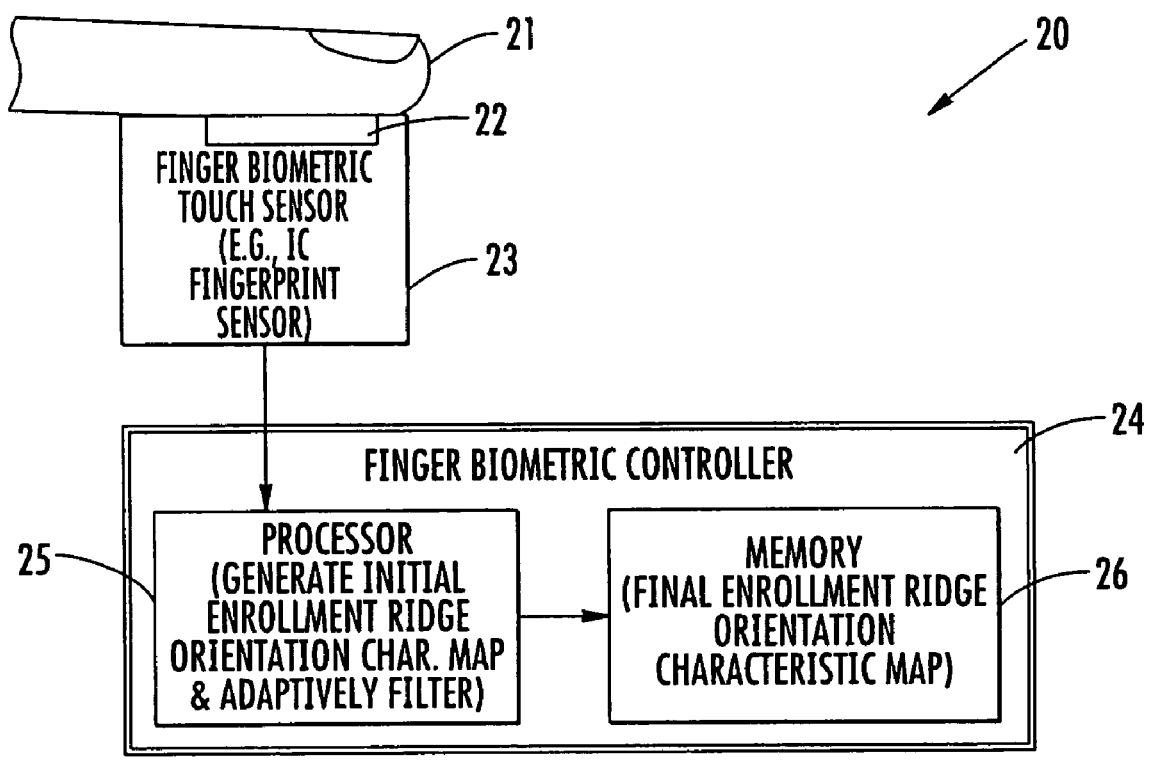
FIG. 2 is a schematic block diagram of a finger biometric sensor in accordance with the present invention.

Referring initially to FIG. 1, some of the basic methods steps for processing finger biometric enrollment data in accordance with the present invention are first described. Beginning at Block 30, an initial enrollment ridge orientation characteristic map (or O-map) for a finger 21 (see FIG. 2) is generated based upon the finger biometric enrollment data, at Block 31, as will be discussed further below. By way of example, the biometric enrollment data may relate to a fingerprint, although other finger biometric features may also be used in some embodiments, as will be appreciated by those skilled in the art. An amount of noise associated with the initial enrollment ridge orientation characteristic map is then estimated, at Block 32, as will also be discussed further below. The initial enrollment ridge orientation characteristic map is then adaptively filtered based upon the amount of estimated noise as well as other local properties such as ridge orientation therein to generate a final enrollment ridge orientation characteristic map, at Block 33, thus concluding the illustrated method (Block 34).

The basic finger biometric sensor 20 for performing the method outlined with reference to FIG. 1 is now described. The finger biometric sensor 20 is a "touch" sensor which illustratively includes a finger biometric sensing area 22 that is part of an integrated circuit (IC) finger biometric sensor 23, for example. The IC finger biometric sensor 23 may be of the RF or electric field sensing type, as described in the above-noted U.S. Pat. No. 5,940,526 to Setlak et al. Of course, other finger biometric sensors may also be used, as will be appreciated by those skilled in the art.

The finger biometric sensor 20 also illustratively includes a finger biometric controller 24 that may reside as separate circuitry or may be included on the integrated circuit substrate that also supports the finger biometric sensing area 23. The controller 24 includes a processor 25 connected to the finger biometric sensing area 22, and a memory connected to the processor 26. The processor 25 may be implemented using a microprocessor, digital signal processor (DSP), application specific integrated circuit (ASIC), and/or other suitable circuitry, as well as software modules, as will be appreciated by those skilled in the art.

The processor 25 generates the initial enrollment ridge orientation characteristic map for the finger 21 based upon the finger biometric enrollment data obtained by the finger biometric sensing area 22. The processor 25 further estimates the amount of noise in the initial enrollment ridge orientation characteristic map, and adaptively filters the initial enrollment ridge orientation characteristic map based upon the amount of estimated noise therein to generate the final enrollment ridge orientation characteristic map. The processor 25 may then store the final enrollment ridge orientation characteristic map in the memory 26 for use in future comparison operations, as will be discussed further below.

Figure 3:
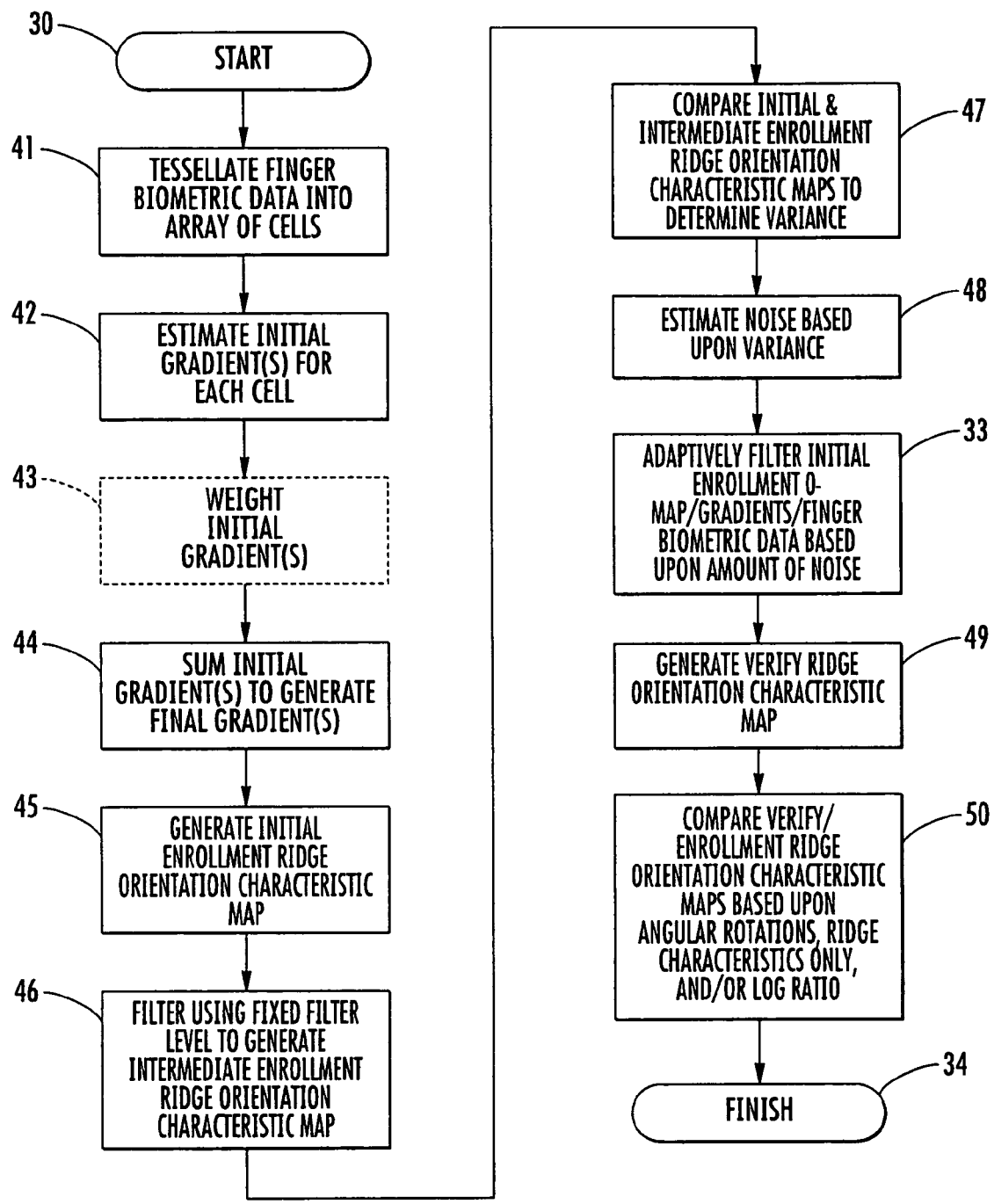
FIG. 3 is a flow diagram illustrating the method of FIG. 1 in greater detail.

Turning now to FIG. 3, additional steps in the above-noted method are now described. The initial enrollment ridge orientation characteristic map is then generated by first tessellating the finger biometric data into an array of cells, at Block 41, and then estimating at least one respective gradient for each cell, at Block 42. Preferably, horizontal gradients, vertical gradients, and a product of the horizontal and vertical gradients are used in constructing the initial enrollment ridge orientation characteristic map, as will be discussed further below. The gradients may optionally be weighted in some embodiments, at Block 43. Initial cell gradients from adjacent groups of cells in the array are then summed to generate at least one final gradient corresponding to each group, at Block 44. The initial enrollment ridge orientation characteristic map may then be generated based upon the final gradients, at Block 45.

The amount of noise associated with the initial enrollment ridge orientation characteristic map may be determined by filtering (i.e., smoothing) the initial enrollment ridge orientation characteristic map using a fixed filtering level to generate an intermediate enrollment ridge orientation characteristic map, at Block 46. The intermediate enrollment ridge orientation characteristic map may then be compared with the initial enrollment ridge orientation characteristic map to determine a variance therebetween, at Block 47, and the amount of noise may be estimated based upon the variance, at Block 48, as will be discussed further below.

Once the noise is estimated, the above-noted adaptive filtering step may be performed, at Block 33, to generate the final enrollment ridge orientation characteristic map, which may be stored in the memory 26 for use in future comparison operations. It should be noted, however, that in alternate embodiments the initial ridge orientation characteristic map need not be smoothed, but instead the finger biometric data or the gradients may be adaptively filtered in a similar fashion to generate the intermediate enrollment ridge orientation characteristic map, and the final map generated based thereon, as will be appreciated by those skilled in the art.

When a user needs to be authenticated, verify (i.e., verification) finger biometric data is generated by the finger biometric sensing area 22, and the same steps described above for generating the final enrollment ridge orientation characteristic map may be performed to generate a final verify ridge orientation characteristic map, at Block 49. The final verify and enrollment ridge orientation characteristic maps may then be compared to determine whether there is a match, and thus authenticate the user if a match does occur, at Block 50.

Generally speaking, the comparison may involve comparing the final verify ridge orientation characteristic map to a plurality of different angular rotations of the final enrollment ridge orientation characteristic map to account for a relative rotation of the finger on the finger biometric sensing area 22 from one finger scan to the next, as will be appreciated by those skilled in the art. More particularly, the processor 25 may compare samples of the verify ridge orientation characteristic map to respective samples of the final enrollment ridge orientation characteristic map using a log likelihood ratio thereof, as will be discussed further below. By generating the ridge orientation characteristic maps as described above, these maps may advantageously be compared with one another based solely upon ridge orientation characteristics, without the need for identifying minutia, etc.

Figure 4:
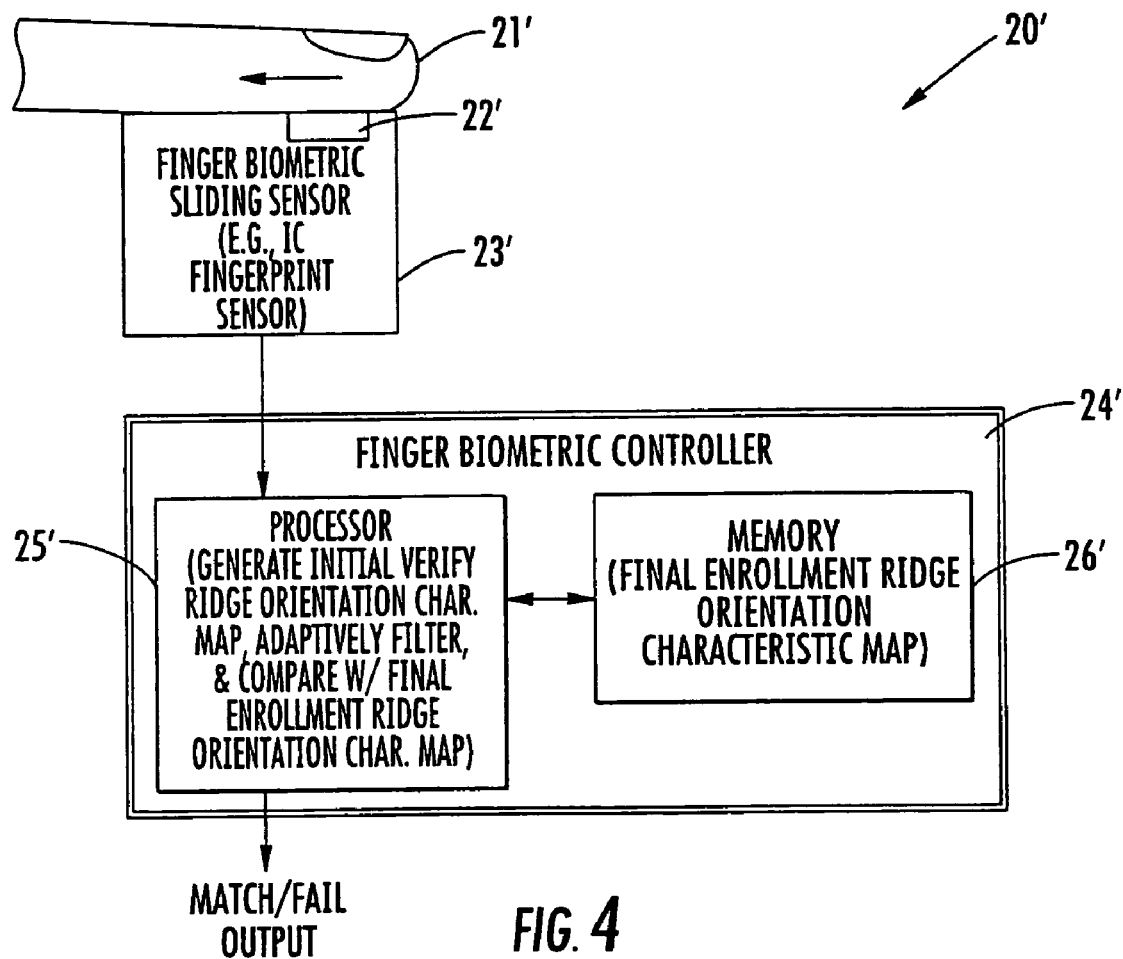
FIG. 4 is a schematic block diagram of an alternate embodiment of the finger biometric sensor of FIG. 2.

An alternate embodiment of the finger biometric sensor 20' in accordance with the present invention is now described with reference to FIG. 4. In this embodiment, the finger biometric sensing area 22' is a sliding sensor area, over which a user slides the finger 21' to generate the finger biometric data, as will be appreciated by those skilled in the art. Once the final verify and enrollment ridge orientation characteristic maps are generated, the processor 25' performs the above-noted comparison operation and provides an output indicating whether a match has been found or not as shown.

Figure 11:
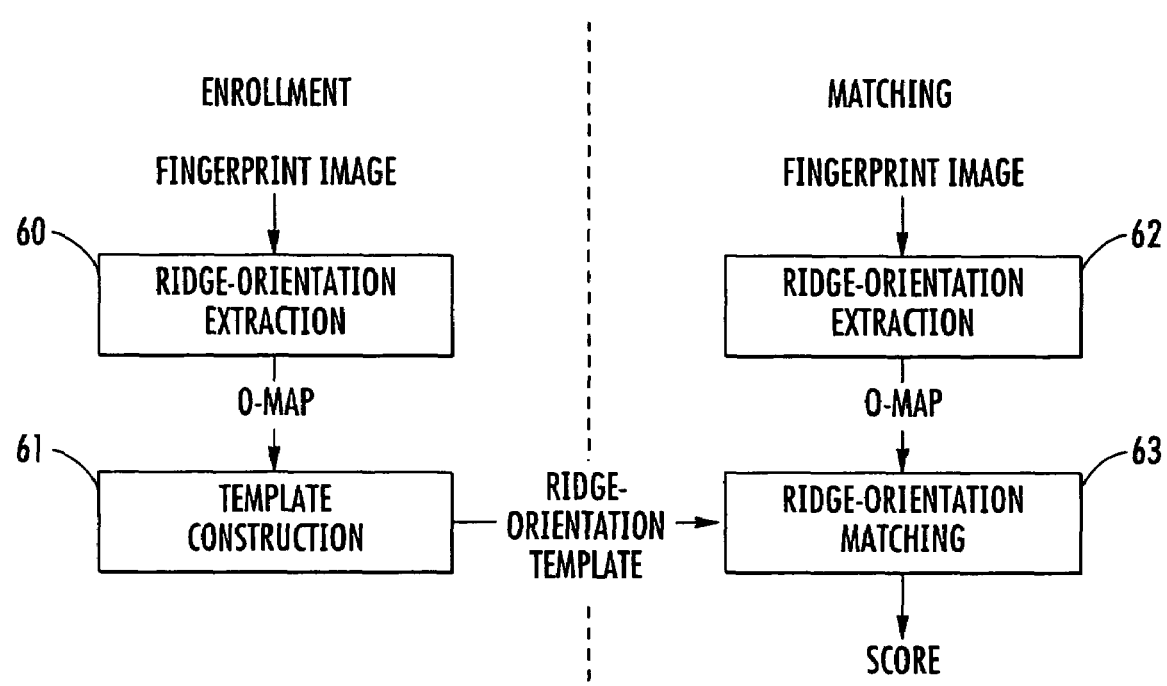
FIG. 11 is a flow diagram generally illustrating the ridge-orientation extraction and matching operations of the method of the present invention.

A number of the steps described generally above are now described in greater detail. Referring to FIG. 11, there are generally two stages in a finger biometric data comparison operation, namely enrollment and matching. In the enrollment stage, the user places his or her finger on the finger biometric sensor area 22'. A finger biometric (e.g., fingerprint) image is acquired and then passed to the controller 24' which extracts the O-map of the fingerprint image, at Block 60. This may be done by a first software module, for example. The resulting O-map may then be passed to another module that constructs the corresponding template and stores it for future reference in the memory 26', at Block 61. In another scenario, several fingerprint images may be acquired, and the above process may be repeated for each of these images. The "best" template is then selected using a criterion that can be based on measures of image quality, image content, and/or cross-match scores, as will be appreciated by those skilled in the art.

The matching stage may be outlined as follows. The user places his or her finger 21 on the sensor area 22 and a single fingerprint image is acquired. This image is processed in a manner similar to that during the enrollment stage to obtain an O-map, at Block 62. This map is then passed to the matching module of the processor, which compares it with the template corresponding to the identity of the user, at Block 63. Matching includes of three stages: alignment estimation, alignment refinement, and match scrutiny, as will be described further below.

The alignment estimation stage attempts to quickly determine a rough estimate of the relative transformation between enroll and verify O-maps (translation and rotation). This transformation is then refined in the second stage through examining the transformation space at a resolution higher than that used in the first stage, and also through attempting to account for non-linear local deformations. Finally, in the third stage, match scrutiny, a detailed comparison is performed between enroll and match O-maps at the alignment provided by the second stage. The output of this process is a score that estimates the degree of similarity between the two maps.

Figure 12:
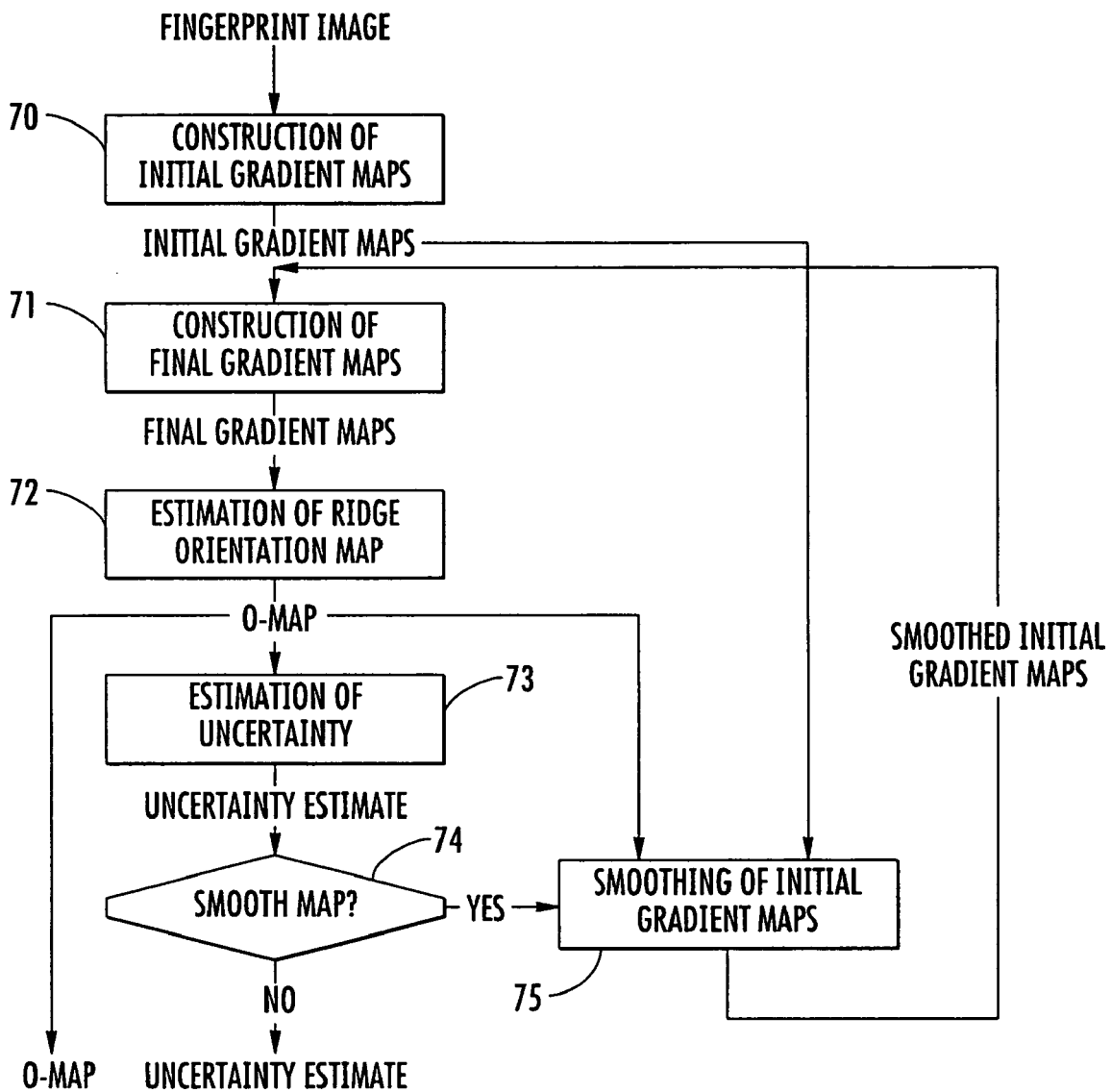
FIG. 12 is a flow diagram illustrating the ridge-orientation extraction operation of FIG. 11 in greater detail.

Turning now additionally to FIG. 12, to construct the initial gradients (Block 70) the image is tessellated into a regular array of cells 55 (see FIG. 5) at a specific resolution. For each cell, gradient operators are applied to estimate the gradient at each pixel. Gradient information is then accumulated into three maps corresponding to the following quantities: average of square of horizontal gradient; average of square of vertical gradient; and average of product of horizontal and vertical gradients. They are referred to as IGxx, IGyy and IGxy maps, respectively. The resolution of the initial gradient maps is selected such that smoothing of these maps will not result in significant skewing of the map values.

To construct the final gradients, at Block 71, the image is tessellated into a regular array of cells 56 at a resolution that is either the same or coarser than that of the initial gradient maps. Final gradient information is obtained from the initial gradient maps IGxx, IGyy and IGxy, to form respective final gradient maps, FGxx, FGyy and FGxy. The value of each cell in a final gradient map is determined by summation (uniform or weighted) of appropriate values of cells in the corresponding initial map, as illustrated in FIG. 5.

The verify/enrollment ridge orientation characteristic maps are generated (Block 72) as follows. The tessellation of the O-map is at the same resolution as the final gradient maps. The ridge orientation at each cell is estimated from corresponding final gradient values using a least-squares error criterion similar to that described in the above-noted article to Hong et al., which his hereby incorporated herein by reference. The gradient information provided by the final gradient maps is then used to discriminate between fingerprint and non-fingerprint blocks.

Two measures, denoted by M and D, are derived from the gradient information in each block. One of them, M, estimates the amount of image contrast (e.g., sum of FGxx and FGyy), while the other, D, estimates the uniformity of the gradient directions irrespective of their magnitudes. These two measures form a two-dimensional feature space. A decision boundary (linear or non-linear) is designed in this space to separate between fingerprint and non-fingerprint blocks. The values of the features M and D are preferably calculated for each block, and then compared with the decision boundary to classify the corresponding block as either fingerprint or non-fingerprint, as will be appreciated by those skilled in the art.

Next, the uncertainty (i.e., the amount of noise) in the O-map is estimated (Block 73). This is done to determine the extent of data smoothing required. Uncertainty can be estimated by smoothing the O-map, at Blocks 74, 75, and then estimating the variance of the difference between respective blocks in the original and smoothed maps. Smoothing of the O-map may be done either directly, or indirectly by first smoothing the initial gradient maps, and then re-estimating the O-map.

Figure 13:
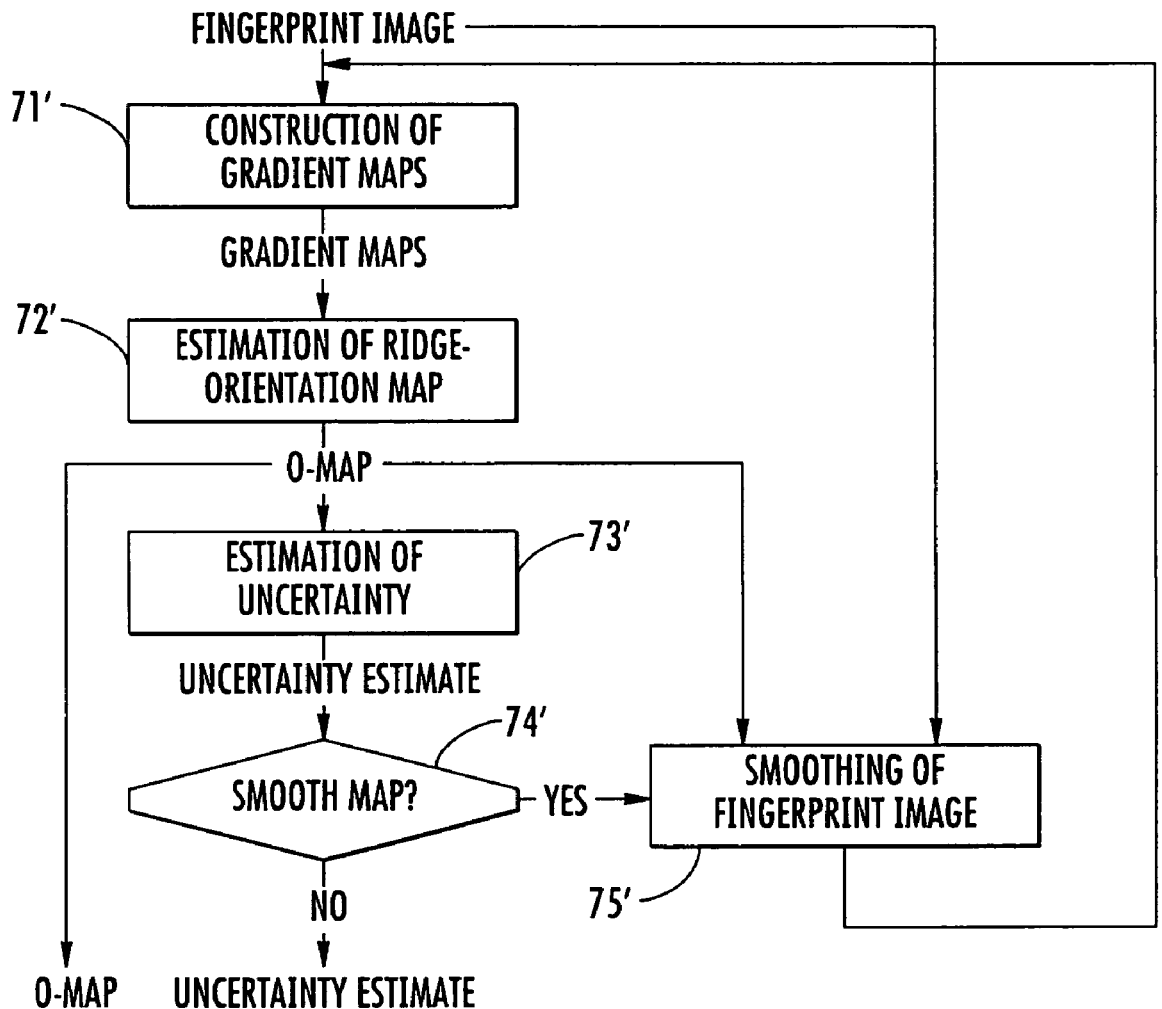
FIG. 13 is a flow diagram illustrating an alternate embodiment of the ridge-orientation extraction method of FIG. 12.

Each gradient map is smoothed using a two-dimensional filter that is adaptive to the local ridge orientation. The scale of the filter, both along and normal to the ridge orientation, is made adaptive to the variance of the uncertainty estimated in the previous step. In an alternate embodiment illustrated in FIG. 13, the fingerprint image itself may be smoothed instead of the initial gradient maps, as will be appreciated by those skilled in the art.

This approach is similar to the one described above with few exceptions. First, final gradient maps are calculated directly from the image. Second, a filter may be used that is adaptive to both ridge orientation and ridge frequency, as discussed in the above-noted article to Hong et al. As in the previous case, the scale of the filter is further made adaptive to the amount of uncertainty. Third, when estimating the uncertainty of the O-map, a smoothed version of the map may be obtained indirectly by smoothing the input image and then re-estimating the O-map, as will be appreciated by those skilled in the art.

The various aspects of the ridge orientation matching will now be further described with reference to FIGS. 6 through 10. The matching module may use a scoring criterion for evaluating the similarity between final enrollment and verify O-maps. This criterion takes into account amounts of uncertainty in the two O-maps, as well as the amount of information in them. Let the two O-maps being matched be labeled as O1 and O2, and their overlapping sections, determined through alignment, as V1 and V2, respectively, as illustrated in FIGS. 6A-6C. The selected criterion is based on a likelihood ratio, which may be defined in several ways. One of them is P(V2|V1, H)/P(V2|V1, not H), where: P(V2|V1, H) is the likelihood of viewing V2 given V1 assuming that the match hypothesis, H, is true; and P(V2|V1, not H) is the likelihood of viewing V2 given V1 assuming that H is false.

Calculation of the numerator of the likelihood ratio, P(V2|V1, H), is first described. Let D12 be a map corresponding to the difference between the orientations in V1 and V2. A simple example is shown in FIG. 7. The probability P(V2|V1, H) depends on map D12. Assuming that these differences are independent, we can express this probability as the product Π X P(D12(X)|H), where X is a cell in D12. The probability P(D12(X)|H) is described using a mixture or combination of two probability distribution functions (PDF's), one to describe the case when both V1(X) and V2(X) are not outliers, and the other to describe the case when at least one of them is an outlier. These PDF's are referred to as PDFin and PDFout, respectively.

The use of a mixture probability allows robustness to outliers, such as the orientation shown in the lower right corner of V2 in FIG. 7. The shape of PDFin (e.g., Gaussian) is first determined, e.g., empirically. It is then parameterized depending mainly on orientation uncertainty variances of O1 and O2, and also on other subtle factors such as the resolution of the transformation space being examined and local deformations. The second component of the mixture PDF, PDFout, may be estimated either empirically, or by making a reasonable assumption (e.g., uniform PDF).

An illustration of the mixture or combination probability is shown in FIG. 8. The mixture probability is a weighted average of PDFin and PDFout. That is, P(D12(X)|H)=(1-k) PDFin(D12(X))+k PDFout(D12(X)). The parameter k corresponds to the outlier probability. It can be set to a fixed number that is estimated empirically. It can also be estimated from maps O1 and O2. Average outlier probability in a given map can be estimated through assessing the similarity of each angle in the map with its neighbors.

In the foregoing discussion, it is assumed that the uncertainty variance and outlier probability are fixed for all cells in D12(X). However, it will be appreciated by those skilled in the art that they may be estimated for each individual cell in D12(X), and used to determine the corresponding probability P(D12(X)|H).

The denominator of the likelihood ratio, P(V2|V1, not H), is calculated as follows. Since V1 and V2 by assumption do not match, we have P(V2|V1, not H)=P(V2). One possible way of estimating P(V2) is through transforming V2 to another map, U2, such that the values in the new map are reasonably independent. This allows expressing P(V2) as Π X P(U2(X)). This map may be obtained using techniques for lossless predictive coding. An example is illustrated in FIG. 9, which shows a map V2 and corresponding differential map U2 obtained through a technique for lossless predictive coding. The PDF of U2(X) is then non-parametrically estimated by constructing the histogram of the values in the map U2.

From the above discussion, it will be appreciated that the likelihood ratio may be expressed as Π X L(X), where L(X) =P(D12(X)|H)/P(U2(X)). It is common to use the log of the likelihood ratio to convert the multiplication operations to additions. The resulting log likelihood ratio may be expressed as Σ X log L(X). Typical shapes of log L(X) are shown in FIG. 10.

It should be noted that there are other possible formulations of the likelihood ratio that can be considered. For example, it is possible to define the likelihood ratio as $P(V_1,V_2|H)/P(V_1,V_2|\text{not } H)$. This formulation is slightly more complicated to implement than the above-described approach, although it may be preferable in some applications, as will be appreciated by those skilled in the art.

Another possible alternative is to extend the scoring criterion so that it penalizes for non-overlapping areas of $O_1$ and $O_2$, i.e., the areas lying outside $V_1$ and $V_2$, respectively. The penalty may be made proportional to not only the sizes of the non-overlapping areas but also the importance of the information in them. In other words, the penalty would increase if a distinct fingerprint region falls outside the overlapping area. If such penalty is desired, then the differential map needs to be calculated for all of $O_2$, and not just $V_2$.

Figure 14:
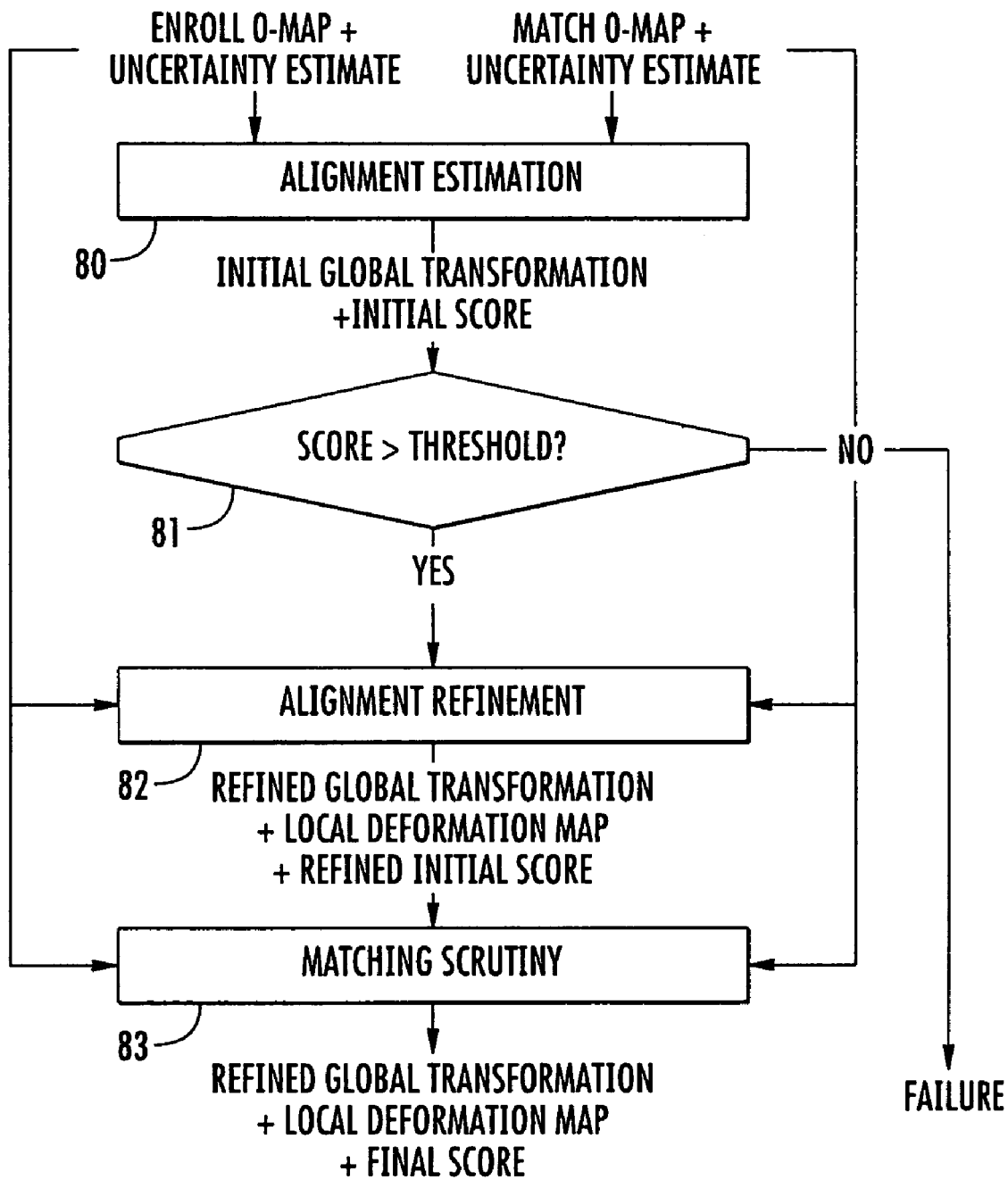
FIG. 14 is a flow diagram illustrating the matching operation of FIG. 11 in greater detail.

Referring now to FIG. 14, the ridge orientation matching process illustratively include alignment estimation (Blocks 80-81), alignment refinement (Block 82), and a match scrutiny (Block 83). The purpose of the alignment estimation is to quickly align enroll and verify O-maps, i.e., find the relative transformation of one O-map with respect to the other. The transformation space is generally assumed to be three-dimensional corresponding to relative rotation and vertical and horizontal translations (scale can be included as well). The acceptable relative transformations form a subspace in the three-dimensional transformation space. Samples of this subspace are selected for evaluation. The resolution of the sampling is the minimum such that the success rate of alignment estimation remains almost unaffected. For each sampled rotation, one of the O-maps is rotated and then compared with the other at selected samples of horizontal and vertical translations.

The process of comparing O-maps can be explained as follows. A sampling of the rotated O-map is obtained through interpolation. The resolution of the O-map sampling is the minimum that allows reliable alignment estimation. The locations of the sampled points and their values are organized in a list, which is referred to as an O-list. The O-list is then compared with the reference O-map at each sampled two-dimensional translation. The comparison is based on the scoring criterion described above. For efficiency purposes, the denominator of the likelihood ratio, P(U2(X)), is replaced by a constant value, which may correspond, for example, to the average of P(U2(X)). The criterion is pre-calculated for all possible ridge orientation differences (−90°,90°), and stored in a lookup list for efficiency purposes.

The comparison between the O-list and the reference O-map at a given transformation continues unless the accumulated score falls beyond some threshold (Block 81). This early exit technique is desirable for fast alignment. Its impact on performance may be improved by randomly shuffling the entries in the O-map before the comparison process. The output of the alignment estimation module is an initial estimate of the global transformation between the two O-maps along with an associated score. This score provides an estimate of the confidence in the transformation. If it falls below a certain threshold, then the matching process gets terminated.

The purpose of alignment refinement is to refine the alignment provided by the alignment estimation module. This is done through both refining the global transformation, and estimating the local deformation between the two O-maps. The refined global transformation is obtained in a fashion similar to that described above with the following few exceptions. First, the acceptable transformation subspace is now a small one that is centered about the global initial transformation. Moreover, the resolution of transformation subspace sampling is maximized. Additionally, the parameterization of the scoring criterion is adjusted to the above new resolution setting. Also, the resolution of the sampling of the rotated O-map is increased.

The local deformation is estimated through independently matching sub-regions of the rotated O-map against the reference map within the acceptable transformation space. These sub-regions can be selected either uniformly or by selecting content rich areas in the O-map. Each sub-region match generates a transformation and an associated score. As in the case of global transformation, the sub-region score determines the reliability of the associated transformation. The difference between the sub-region transformation and the global one can be viewed as an estimate of the local deformation at the sub-region. This set of transformation differences can be seen as samples in a vector valued function whose independent variables are the O-map coordinates, and dependent variables are the three transformation parameters. This vector-valued function is referred to as the local deformation map. It can be constructed from the sampled values through the application of an interpolation scheme (e.g., using splines), as will be appreciated by those skilled in the art.

Match scrutiny is the final stage in the ridge orientation matching process. It involves performing detailed matching between the two O-maps to generate the final matching score. First, the appropriate O-map is transformed according to both the global transformation and the local deformation map. The sampling of the transformed map is done at the maximum possible resolution. The transformed O-map is then compared with the reference map using the log likelihood ratio criterion described above to generate the final matching score. This involves calculating the differential map for one of the O-maps, and constructing the histogram of its values.

Additional features of the invention may be found in co-pending applications entitled SPOT-BASED FINGER BIOMETRIC PROCESSING METHOD AND ASSOCIATED SENSOR, and METHODS FOR FINGER BIOMETRIC PROCESSING AND ASSOCIATED FINGER BIOMETRIC SENSORS, the entire disclosures of which are hereby incorporated herein by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for processing finger biometric data comprising:
    sensing finger biometric data from a finger using a finger biometric sensor;
    generating, using a processor, an initial ridge orientation characteristic map for the finger based upon the finger biometric data by at least
        tessellating the finger biometric data into an array of cells,
        estimating at least one respective gradient for each cell, and
        generating the initial ridge orientation characteristic map based upon the estimated gradients;
    estimating, using the processor, an amount of noise in the initial ridge orientation characteristic map; and
    adaptively filtering, using the processor, the initial ridge orientation characteristic map based upon the amount of estimated noise therein to generate a final ridge orientation characteristic map.

2. The method of claim 1 wherein estimating the amount of noise comprises:
    filtering the initial ridge orientation characteristic map using a fixed filtering level to generate an intermediate ridge orientation characteristic map;
    comparing the intermediate ridge orientation characteristic map with the initial ridge orientation characteristic map to determine a variance therebetween; and
    estimating the amount of noise based upon the variance.

3. The method of claim 1 wherein estimating the at least one respective gradient for each cell comprises estimating at least one initial gradient for each cell, and summing initial cell gradients from adjacent groups of cells in the array to generate at least one final gradient corresponding to each group; and wherein generating the initial ridge orientation characteristic map comprises generating the initial ridge orientation characteristic map based upon the final gradients.

4. The method of claim 3 further comprising weighting the initial cell gradients from each group of cells prior to summing.

5. The method of claim 3 wherein the at least one gradient comprises a horizontal gradient, a vertical gradient, and a product of the horizontal and vertical gradients.

6. The method of claim 3 further comprising filtering the estimated gradients prior to generating the initial ridge orientation characteristic map.

7. The method of claim 1 further comprising filtering the finger biometric data prior to generating the initial ridge orientation characteristic map.

8. The method of claim 1 wherein the finger biometric data comprises finger biometric enrollment data, and wherein the final ridge orientation characteristic map comprises an enrollment ridge orientation characteristic map; and further comprising:
    generating a verify ridge orientation characteristic map based upon finger biometric verify data; and
    comparing the verify ridge orientation characteristic map to the enrollment ridge orientation characteristic map to determine a match therewith.

9. The method of claim 8 further comprising:
    generating a first probability distribution function substantially for corresponding values of the verify and enrollment ridge orientation characteristic maps that differ from one another by less than or equal to a threshold difference; and
    generating a second probability distribution function substantially for corresponding values of the verify and enrollment ridge orientation characteristic maps that differ from one another by more than the threshold difference;
    and wherein comparing comprises comparing the verify ridge orientation characteristic map to the enrollment ridge orientation characteristic map based upon the first and second probability distribution functions.

10. The method of claim 9 wherein comparing comprises comparing based upon a combined probability distribution function comprising a weighted summation of the first and second probability distribution functions.

11. The method of claim 10 wherein one of the first and second probability distribution functions is weighted by a probability k that at least one set of corresponding values of the verify and enrollment ridge orientation characteristic maps will differ from one another by more than the threshold difference, and the other of the first and second probability distribution functions is weighted by 1-k.

12. The method of claim 9 further comprising generating a differential probability distribution function based upon differential properties of adjacent values in at least one of the verify and enrollment ridge orientation characteristic maps; and wherein comparing further comprises comparing the verify ridge orientation characteristic map to the enrollment ridge orientation characteristic map also based upon the differential probability distribution function.

13. The method of claim 12 wherein comparing comprises generating a likelihood ratio based upon the first and second probability distribution functions and the differential probability distribution function.

14. The method of claim 9 further comprising:
generating an initial first probability distribution function and an initial second probability distribution function for a subset of corresponding values of the verify and enrollment ridge orientation characteristic maps; and
determining a relative alignment between the verify and enrollment ridge orientation characteristic maps prior to comparing based upon the initial first and second probability distribution functions.

15. The method of claim 14 further comprising:
dividing at least one of the verify and enrollment ridge orientation characteristic maps into a plurality of sections;
estimating a local deformation associated with each section based upon the determined relative alignment; and
updating the relative alignment between the verify and enrollment ridge orientation characteristic maps based upon the estimated local deformations.

16. The method of claim 14 further comprising generating a match failure if the determined relative alignment is smaller than an alignment threshold.

17. The method of claim 8 further comprising determining an overlap between the verify ridge orientation characteristic map and the enrollment ridge orientation characteristic map; and wherein comparing comprises comparing the verify ridge orientation characteristic map and the enrollment ridge orientation characteristic map based upon the overlap.

18. The method of claim 8 wherein comparing comprises comparing the verify ridge orientation characteristic map to a plurality of different angular rotations of the enrollment ridge orientation characteristic map.

19. The method of claim 9 wherein comparing comprises comparing the verify ridge orientation characteristic map to the enrollment ridge orientation characteristic map based solely upon ridge orientation characteristics.

20. A method for comparing a finger biometric verify ridge orientation characteristic map to a finger biometric enrollment ridge orientation characteristic map performed by a finger biometric controller comprising:
sensing finger biometric data from a finger using a finger biometric sensor;
generating the finger biometric verify ridge orientation characteristic map based upon the finger biometric data;
generating a first probability distribution function substantially for corresponding values of the verify and enrollment ridge orientation characteristic maps that differ from one another by less than or equal to a threshold difference;
generating a second probability distribution function substantially for corresponding values of the verify and enrollment ridge orientation characteristic maps that differ from one another by more than the threshold difference; and
comparing the verify ridge orientation characteristic map to the enrollment ridge orientation characteristic map to determine a match therewith based upon the first and second probability distribution functions.

21. The method of claim 20 wherein comparing comprises comparing based upon a combined probability distribution function comprising a weighted summation of the first and second probability distribution functions.

22. The method of claim 20 further comprising generating a differential probability distribution function based upon differential properties of adjacent values in at least one of the verify and enrollment ridge orientation characteristic maps; and wherein comparing further comprises comparing the verify ridge orientation characteristic map to the enrollment ridge orientation characteristic map also based upon the differential probability distribution function.

23. The method of claim 20 further comprising:
generating an initial first probability distribution function and an initial second probability distribution function for a subset of corresponding values of the verify and enrollment ridge orientation characteristic maps; and
determining a relative alignment between the verify and enrollment ridge orientation characteristic maps prior to comparing based upon the initial first and second probability distribution functions.

24. The method of claim 20 further comprising determining an overlap between the verify ridge orientation characteristic map and the enrollment ridge orientation characteristic map; and wherein comparing further comprises comparing the verify ridge orientation characteristic map and the enrollment ridge orientation characteristic map based upon the overlap.

25. A finger biometric sensor comprising:
a finger biometric sensing area for sensing finger biometric enrollment data from a finger; and
a processor connected to said finger biometric sensing area for
arranging the finger biometric data into an array of cells,
estimating at least one respective gradient for each cell,
generating an initial ridge orientation characteristic map for the finger based upon the finger biometric data based upon the gradients by at least
tessellating the finger biometric data into an array of cells,
estimating at least one respective gradient for each cell, and
generating the initial ridge orientation characteristic map based upon the estimated gradients;
estimating an amount of noise in the initial ridge orientation characteristic map,
adaptively filtering the gradients based upon the amount of estimated noise, and
generating a final ridge orientation characteristic map based upon the filtered gradients.

26. The finger biometric sensor of claim 25 wherein said processor estimates the amount of noise by:
filtering the initial ridge orientation characteristic map using a fixed filtering level to generate an intermediate ridge orientation characteristic map;
comparing the intermediate ridge orientation characteristic map with the initial ridge orientation characteristic map to determine a variance therebetween; and estimating the amount of noise based upon the variance.

27. The finger biometric sensor of claim 25 wherein said processor arranges the finger biometric data by tessellating the finger biometric data into the array of cells.

28. The finger biometric sensor of claim 25 wherein said processor estimates the at least one respective gradient for each cell by estimating at least one initial gradient for each cell, and summing initial cell gradients from adjacent groups of cells in the array to generate at least one final gradient corresponding to each group; and wherein said processes generates the initial ridge orientation characteristic map by generating the initial ridge orientation characteristic map based upon the final gradients.

29. The finger biometric sensor of claim 25 wherein the at least one gradient comprises a horizontal gradient, a vertical gradient, and a product of the horizontal and vertical gradients.

* * * * *

UNITED STATES PATENT AND TRADEMARK OFFICE
CERTIFICATE OF CORRECTION

PATENT NO. : 7,599,530 B2
APPLICATION NO. : 10/957335
DATED : October 6, 2009
INVENTOR(S) : Boshra It is certified that error appears in the above-identified patent and that said Letters Patent is hereby corrected as shown below:

| | |
|---|---|
| Column 7, Line 49 | Delete: "of" |
| Column 8, Line 23 | Delete: "his"<br>Insert: --is-- |
| Column 10, Line 23 | Delete: "include"<br>Insert: --includes-- |
| Column 13, Line 51 | Delete: "9"<br>Insert: --8-- |
| Column 16, Line 1 | Delete: "processes"<br>Insert: --processor-- |

Signed and Sealed this

Fifth Day of October, 2010

David J. Kappos
*Director of the United States Patent and Trademark Office*